(12) United States Patent
Yan et al.

(10) Patent No.: US 12,308,753 B2
(45) Date of Patent: May 20, 2025

(54) METHOD OF CONTROLLING RESONANT PUSH-PULL CONVERTER

(71) Applicant: DELTA ELECTRONICS, INC., Taoyuan (TW)

(72) Inventors: Yung-Sheng Yan, Taoyuan (TW); Chung-Chieh Cheng, Taoyuan (TW); Cheng-Ting Chou, Taoyuan (TW); Kun-Jang Kuo, Taoyuan (TW); Sheh-Jung Wen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 227 days.

(21) Appl. No.: 18/095,625

(22) Filed: Jan. 11, 2023

(65) Prior Publication Data
US 2024/0014744 A1   Jan. 11, 2024

(30) Foreign Application Priority Data
Jul. 11, 2022   (CN) .......................... 202210809777.7

(51) Int. Cl.
*H02M 3/00*   (2006.01)
*H02M 3/335*   (2006.01)
*H02M 3/337*   (2006.01)

(52) U.S. Cl.
CPC ........... *H02M 3/3376* (2013.01); *H02M 3/01* (2021.05); *H02M 3/33569* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515;
(Continued)

(56) References Cited

U.S. PATENT DOCUMENTS

| 8,934,267 B2 | 1/2015 | He et al. | |
| 11,750,099 B2* | 9/2023 | Zafarana | H02M 1/08 323/271 |

(Continued)

FOREIGN PATENT DOCUMENTS

| CN | 109149953 A | 1/2019 |
| CN | 109149954 A | 1/2019 |
| WO | 2012100740 A1 | 8/2012 |

OTHER PUBLICATIONS

Rossetto et al. ("Quasi-Resonant Multi-Output DC/DC Converter with Push-Pull Topology", 1994, IEEE, pp. 971-977 (Year: 1994).*
(Continued)

*Primary Examiner* — Jeffrey A Gblende
(74) *Attorney, Agent, or Firm* — Muncy, Geissler, Olds & Lowe, P.C..

(57) ABSTRACT

A method of controlling a resonant push-pull converter is disclosed. The resonant push-pull converter includes a transformer, a first switch, a second switch, a resonant tank, and a rectifying circuit. The method includes a step of a fixed on-time control. In the fixed on-time control, a first control signal with a fixed on-time is used to control the first switch, and a second control signal with the fixed on-time is used to control the second switch so that the first switch and the second switch are alternately switched.

8 Claims, 5 Drawing Sheets

(58) Field of Classification Search
CPC ......... H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | | |
|---|---|---|---|---|
| 2009/0290389 | A1* | 11/2009 | Ueno | H02M 3/337 363/21.02 |
| 2011/0090717 | A1* | 4/2011 | Lee | H02M 3/33584 363/21.02 |
| 2013/0234531 | A1* | 9/2013 | Budgett | H04B 5/79 307/104 |
| 2014/0022826 | A1 | 1/2014 | He et al. | |

OTHER PUBLICATIONS

L. Rossetto et al: "Quasi-resonant multi-output DC/DC converter with push-pull topology", Proceedings of the Annual Applied Power Electronics Conference and Exposition (APEC), Orlando, Feb. 13-17, 1994; New York, IEEE, US, vol. 2, pp. 971-972, Section 1. Introduction; Subsection 3A Single-output configuration; Subsection 4C Switching frequency range; Section 5. Control Curcuit Design; Figs. 1-4.

Ilya Zeltser: "Analysis of a lower power, high voltage and high gain capacitor charger with output sourcing behavior", 2017 IEEE Applied Power Electronics Conference and Exposition (APEC), IEEE, Mar. 26, 2017, pp. 1640-1646, Subsection II. A; Figs. 1, 3.

Search Report dated Nov. 22, 2023 of the corresponding European patent application No. 23151943.0.

Office Action dated Aug. 24, 2023 of the corresponding Taiwan patent application No. 111125861.

Office Action dated Apr. 26, 2024 of the corresponding Taiwan patent application No. 111125861.

Qiang Tong et al, "Research on Resonance Soft Switching DC/DC Topologies Used in Cascaded Converters", Proceedings of the 2nd International Conference on Electronic Mechanical Engineering and Information Technology (EMEIT 2012) Atlantis Press, Sep. 2012, 5 pages.

Young-Ho Kim et al, "Soft-Switching Current-Fed Push-Pull Converter for 250-W AC Module Applications" IEEE Transactions on Power Electronics 29(2):863-872, IEEE, Feb. 2014, 10 pages.

* cited by examiner

METHOD OF CONTROLLING RESONANT PUSH-PULL CONVERTER

BACKGROUND

Technical Field

The present disclosure relates to a method of controlling a resonant push-pull converter, and more particularly to a method of controlling a wide-range full-resonance resonant push-pull converter.

Description of Related Art

The statements in this section merely provide background information related to the present disclosure and do not necessarily constitute prior art.

For an on-line uninterruptible power supply system (UPS), there are generally three operation modes: an online mode, a backup mode, and a bypass mode. In the backup power supply mode, the battery supplies power to a load through a DC-DC converter and an DC-AC inverter. Usually, the DC-DC converter converts a battery voltage to the voltage value required by a DC bus, and the DC-AC inverter converts a DC voltage of the DC bus into an AC voltage output.

Limited by the voltage value of a single battery, the UPS system generally adopts a battery pack composed batteries connected in series. In addition, in order to increase the reliability of the UPS system, the number of batteries connected in series is generally small, which results in a lower output voltage value of the battery pack. In comparison with the half-bridge and full-bridge converters, push-pull converters have relatively low conduction losses.

In order to increase the power density of the UPS system, it is an inevitable choice to increase the operation frequency of the power system. However, in order for the power system to operate at higher switching frequencies, switching losses must be reduced. In addition, since the battery itself provides precious and limited electrical energy, the efficiency requirements of the powered system are relatively high. The DC-DC converters used in the current commercially available UPS systems, such as push-pull converters, mostly belong to the hard switching mode of power switches, and the overall conversion efficiency is poor due to switching losses. For the above-mentioned reasons, research on various soft switching circuits becomes very important.

SUMMARY

An object of the present disclosure is to provide a method of controlling a resonant push-pull converter to solve the problems of existing technology.

In order to achieve the above-mentioned objective, the method of controlling a resonant push-pull converter, the resonant push-pull converter includes a transistor, a first switch, a second switch, a resonant tank, and a rectifying circuit. The transistor includes a primary-side winding and a secondary-side winding, wherein the primary-side winding includes a first center-tapped end, a first end, and a second end, and the first center-tapped end is coupled to a DC input voltage. The first switch is coupled between the first end and a ground end providing a grounding level of the DC input voltage. The second switch is coupled between the second end and the ground end. The resonant tank is coupled to the secondary-side winding or the primary-side winding. The rectifying circuit is coupled to the secondary-side winding, and converts AC power provided by the secondary-side winding into a DC output voltage. The method includes a fixed on-time control of: controlling the first switch by a first control signal with fixed on-time, and controlling the second switch by a second control signal with fixed on-time so as to alternately switch the first switch and the second switch.

In one embodiment, after the fixed on-time control includes a frequency switching control of: decreasing a switching frequency of the first control signal and a switching frequency of the second control signal when loading decreases; increasing the switch frequency of the first control signal and the switching frequency of the second control signal when loading increases.

In one embodiment, after the frequency switching control includes an output voltage control of: adaptively adjusting the DC output voltage according to the DC input voltage and the switching frequency of the first control signal and the second control signal.

In one embodiment, after the fixed on-time control includes an output voltage control of: adaptively adjusting the DC output voltage according to the DC input voltage and a switching frequency of the first control signal and a switching frequency of the second control signal.

In one embodiment, performing the fixed on-time control according an input voltage signal corresponding to the DC input voltage and an output current signal.

In one embodiment, performing the fixed on-time control under different loading amount.

In one embodiment, the resonant push-pull converter further includes an output capacitor. The output capacitor is coupled in parallel to an output side of the rectifying circuit.

In one embodiment, the resonant tank includes one series-connected branch, and the series-connected branch includes a resonant inductor and a resonant capacitor connected in series.

In one embodiment, the resonant push-pull converter further includes two output capacitors. The two output capacitors are connected in series, and the series-connected output capacitors coupled in parallel to an output side of the rectifying circuit to provide the DC output voltage.

In one embodiment, the secondary-side winding includes two winding ends and a second center-tapped end. The resonant tank includes two series-connected branches, and each series-connected branch includes a resonant inductor and a resonant capacitor connected in series. The two series-connected branches are respectively coupled to the two winding ends, and a common contact of the two series-connected output capacitors is coupled to the second center-tapped end.

In one embodiment, the fixed on-time control is performed by an analog controller or a digital controller.

Accordingly, the present disclosure has the following features and advantages. 1. The fixed on-time control is performed under different loading amount so that the control can be simplified and the resonance soft-switching can be achieved. 2. The operation (switching) frequency is adjusted with the loading and input voltage to achieve wide-range full-resonant operation under light-load operation. 3. The target value of the output voltage may be varied widely by adjusting under the limited duty cycle so that the allowable variation range of the input voltage is increased, and therefore it is beneficial to select the battery to provide the flexibility and convenience of the input voltage. 4. The series-connected resonance technology through the resonant push-pull converters is introduced to change power switches of the converters to be soft switched by the inductor-capacitor resonance operation, thereby making the switching loss zero to increase the conversion efficiency and be beneficial to the heat dissipation design, reducing the surge voltage of the transistor so that the selected components can be rated down, and reducing the interference source generated by electromagnetic compatibility.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
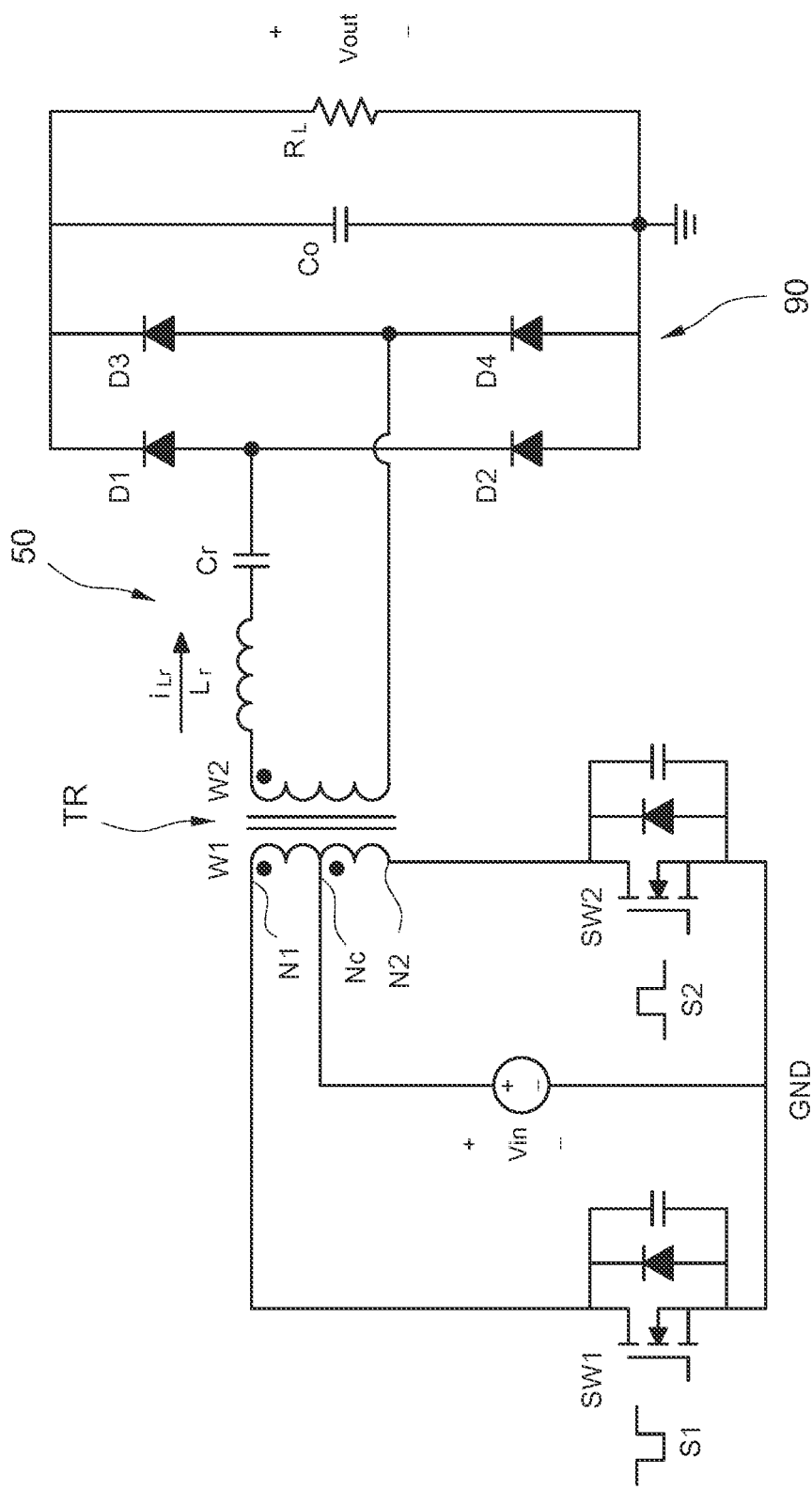
FIG. 1 is a circuit diagram of a resonant push-pull converter applied to a single-bus structure according to the present disclosure.

Reference will now be made to the drawing figures to describe the present disclosure in detail. It will be understood that the drawing figures and exemplified embodiments of present disclosure are not limited to the details thereof.

In order to improve the problem that the current push-pull series resonance technology cannot be soft-switched under the light load and high input voltage of the converter, the present disclosure proposes an optimized control method to achieve soft switching of resonance, thereby increasing efficiency and improving the problem of transistor surges (spikes), and reducing the interference source generated by electromagnetic compatibility.

Figure 2:
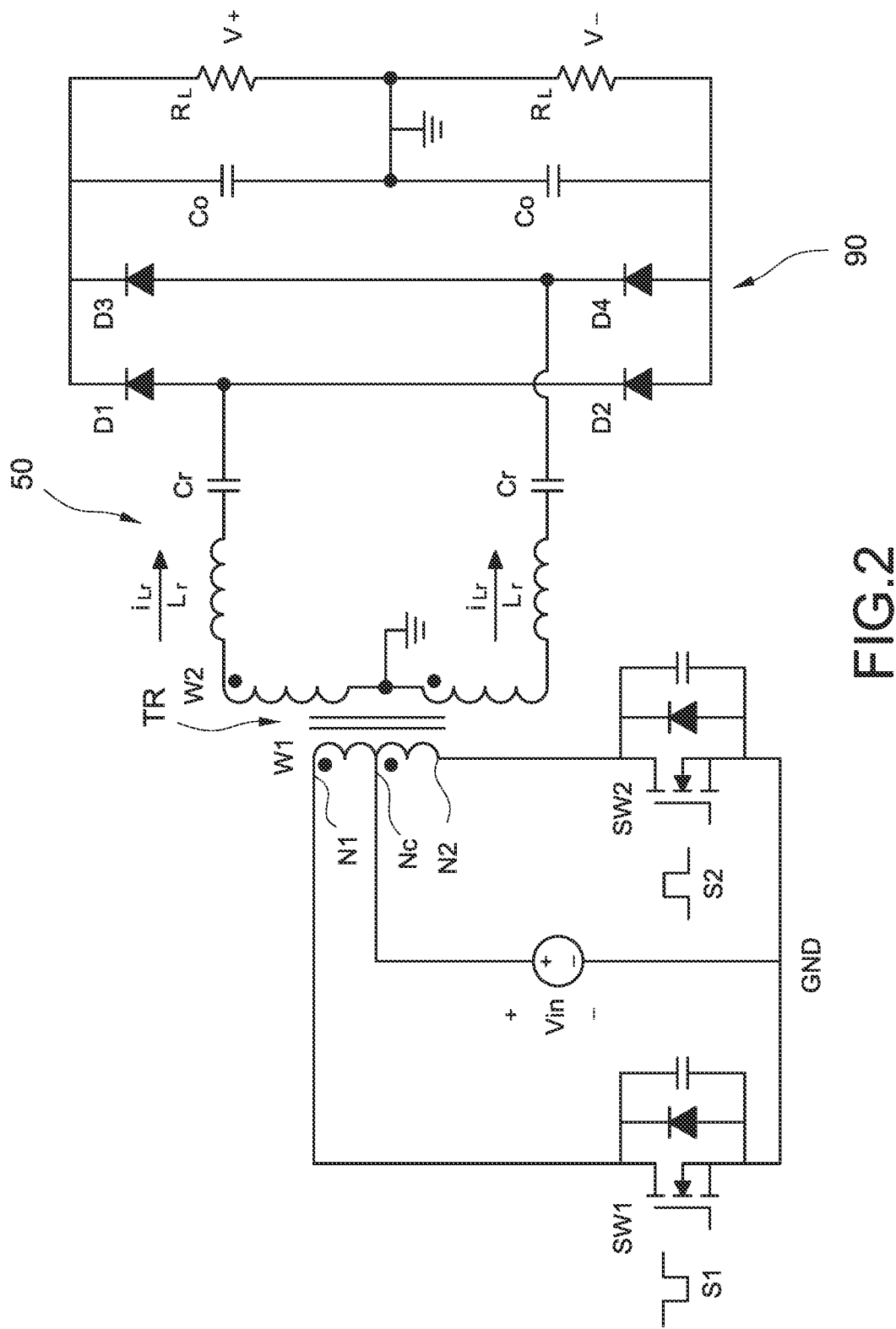
FIG. 2 is a circuit diagram of the resonant push-pull converter applied to a dual-bus structure according to the present disclosure.

Please refer to FIG. 1 and FIG. 2, which show circuit diagrams of a resonant push-pull converter applied to a single-bus structure and a dual-bus structure according to the present disclosure, respectively. The resonant push-pull converter includes a transformer TR and a primary-side circuit and a secondary-side circuit isolated by the transformer TR. The transformer TR includes a primary-side winding W1 and a secondary-side winding W2. The primary-side winding W1 is coupled to the primary-side circuit, and the secondary-side winding W2 is coupled to the secondary-side circuit. The primary-side winding W1 includes a first center-tapped end Nc, a first end N1, and a second end N2, and the first center-tapped end Nc is coupled to a DC (direct-current) input voltage Vin.

The primary-side circuit includes a first switch SW1 and a second switch SW2. The first switch SW1 is coupled between the first end and a ground end GND providing a ground level of the DC input voltage Vin. The second switch SW2 is coupled between the second end N2 and the ground end GND.

The secondary-side circuit includes a resonant tank 50 and a rectifying circuit 90. In one embodiment, the resonant tank 50 is coupled to the secondary-side winding W2. The rectifying circuit 90 is coupled to the resonant tank 50 and the secondary-side winding W2, and is used to convert AC power provided by the secondary-side winding W2 into a DC output voltage Vout. In different embodiments, however, the resonant tank 50 may be coupled to the primary-side winding W1, which may also operate as a resonant conversion. Moreover, the rectifying circuit 90 is represented by diodes D1 to D4 in the figure, but it is not limited thereto.

As shown in FIG. 1, the resonant push-pull converter is applied to a single-bus structure. In this structure, one output capacitor Co is provided at a DC output bus of the resonant push-pull converter, and the output capacitor Co is coupled in parallel to the rectifying circuit 90 for providing the DC output voltage Vout to a rear-end load RL. As shown in FIG. 2, the resonant push-pull converter is applied to a dual-bus structure. In this structure, two output capacitors Co are provided on the DC output bus of the resonant push-pull converter, and the two output capacitors Co are connected in series, and coupled in parallel to the rectifying circuit 90 for providing the DC output voltage Vout to the rear-end load RL. More specifically, in the dual-bus structure shown in FIG. 2, the secondary-side winding W2 is a center-tapped winding, and a common contact of the two series-connected output capacitors Co is coupled to the center-tapped end of the secondary-side winding W2. Furthermore, the resonant tank 50 is in a symmetrical form (each of the upper and lower sides of the resonant tank 50 has a set of inductor-capacitor (Lr, Cr). Therefore, corresponding to the different bus structures (with one output capacitor Co in FIG. 1 and two output capacitors Co in FIG. 2), the series resonant tank structure formed by the inductor-capacitor (Lr, Cr) of the resonant push-pull converter is also different. By the inductor-capacitor (Lr, Cr) resonance operation is to: 1. achieve zero switching loss, which increases the conversion efficiency and is beneficial to the heat dissipation design, and 2. reduce the surge voltage of the transistor so that the selected components can be rated down, and reduce the interference source generated by electromagnetic compatibility.

The resonant push-pull converter is used to boost (step up) a low battery voltage (for example, but not limited to, 12 volts) to 200-400 volts (on the DC output bus), and then the DC output voltage Vout of the resonant push-pull converter is switched to a high-frequency square wave through a rear-end inverter, and the square wave is rectified by a rectifying circuit to generate an AC power source with a low-frequency sine wave that supplies power to the system load.

Figure 3:
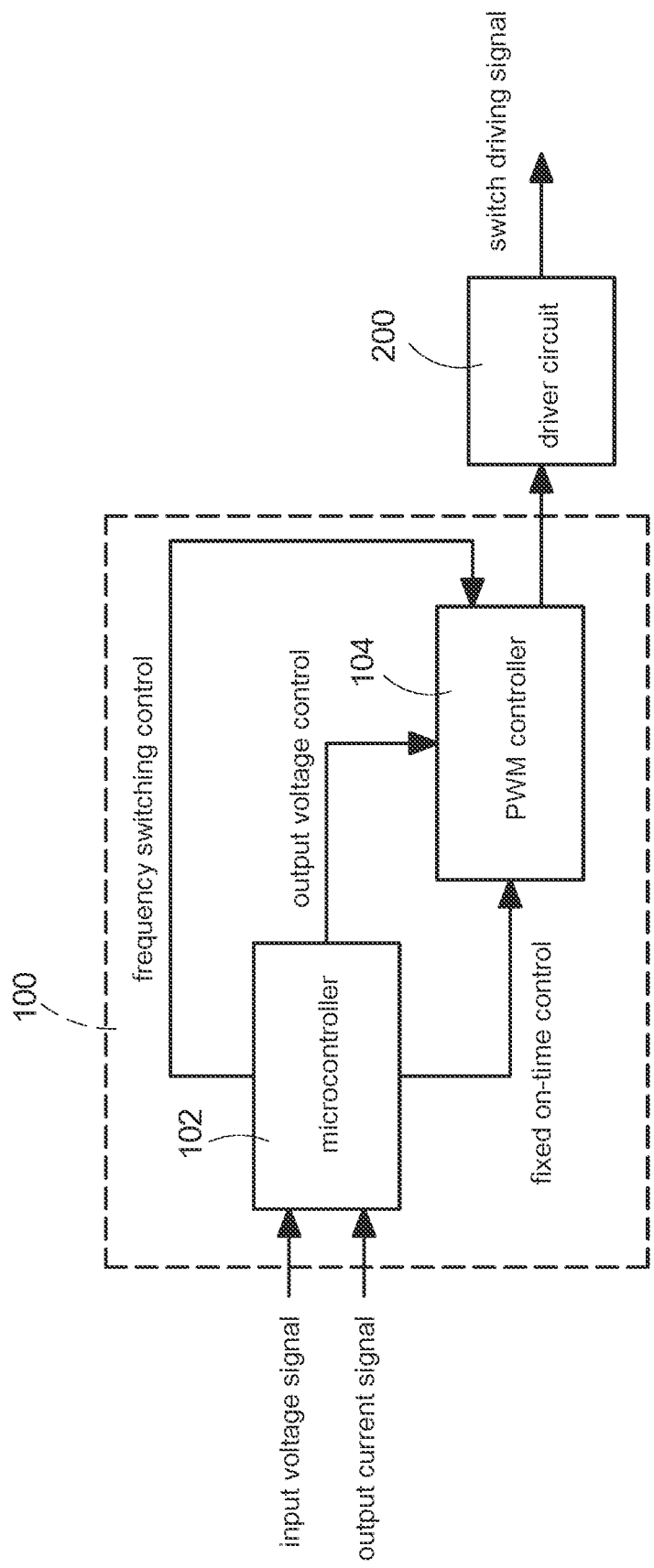
FIG. 3 is a schematic diagram of a method of controlling the resonant push-pull converter implemented by a control unit according to the present disclosure.

Please refer to FIG. 3, which shows a schematic diagram of a method of controlling the resonant push-pull converter implemented by a control unit 100 according to the present disclosure. The control method is implemented/executed by the control unit 100, and the control method mainly includes three control manners of interdependence, which are used to control the first switch SW1 and the second switch SW2 of the primary-side circuit. The three control manners include: 1. Fixed on-time control, 2. Frequency switching control, 3. Output voltage control. In particular, the control method may use fixed on-time control only, or the frequency switching control is used incorporated with the fixed on-time control, or the output voltage control is used incorporated with the fixed on-time control, or the frequency switching control and the output voltage control are used incorporated with the fixed on-time control. The content and description of different control manners will be described in detail later.

Figure 4:
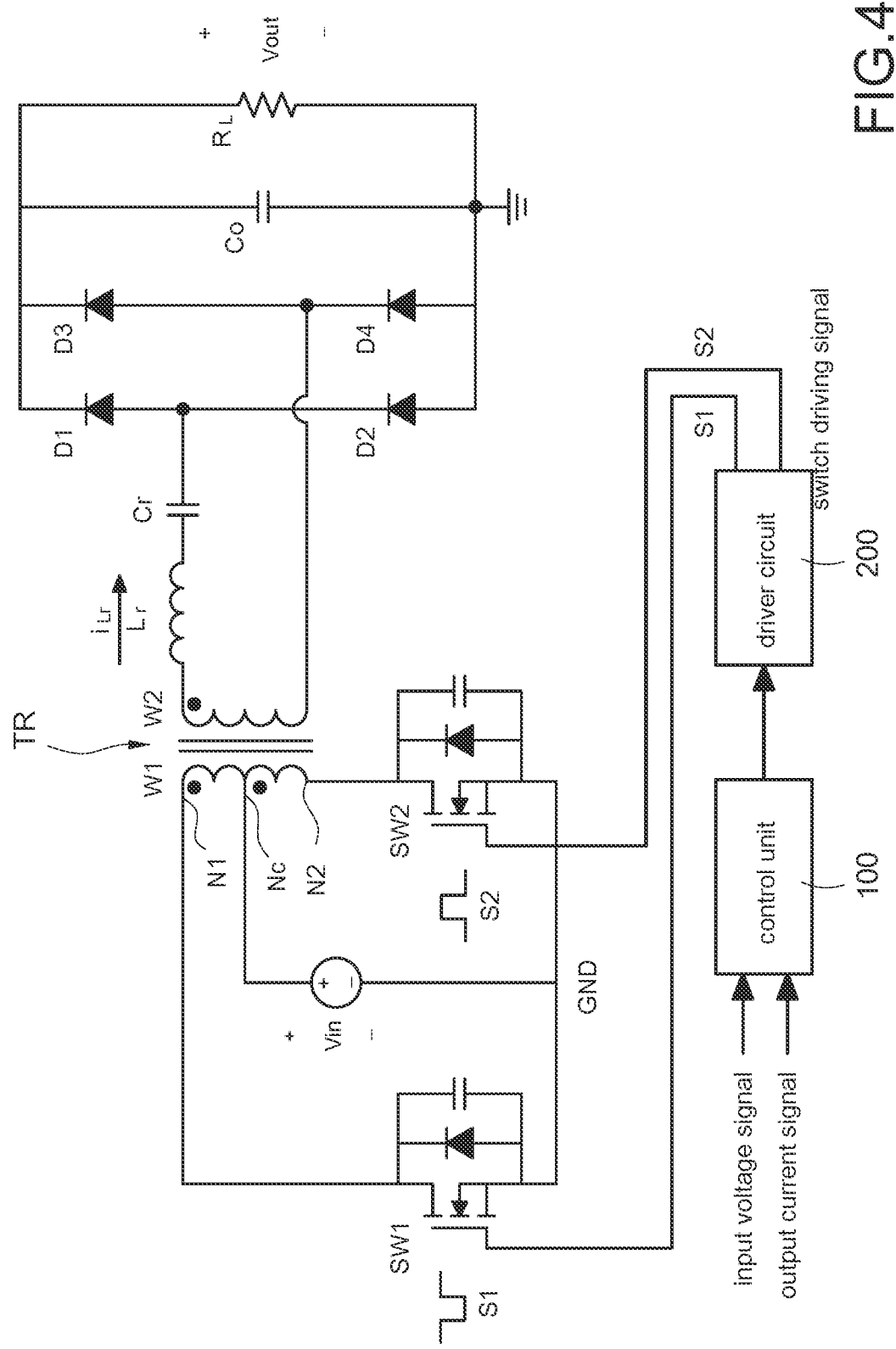
FIG. 4 is a block circuit diagram with control mechanism according to the present disclosure.

As shown in FIG. 3, the control unit 100 may be an analog control (integrated) circuit including a microcontroller 102 and a PWM controller 104. The microcontroller 102 receives an input voltage signal (i.e., a signal of the input voltage, such as a battery voltage) and an output current signal to perform the fixed on-time control, the frequency switching control, and the output voltage control so that switch driving signals (i.e., a first control signal S1 and a second control signal S2) are generated by the PWM controller 104. The switch driving signals are provided to switch the first switch SW1 and the second switch SW2 through a driver circuit 200. However, the control unit 100 is not limited to the analog control (integrated) circuit, which means that the control unit 100 may be fully digitally designed. As shown in FIG. 4, the control unit 100 may be digitally realized to directly generate the switch driving signals of the first control signal S1 and the second control signal S2, and the driver circuit 200 performs switching control of the first switch SW1 and the second switch SW2.

Figure 5:
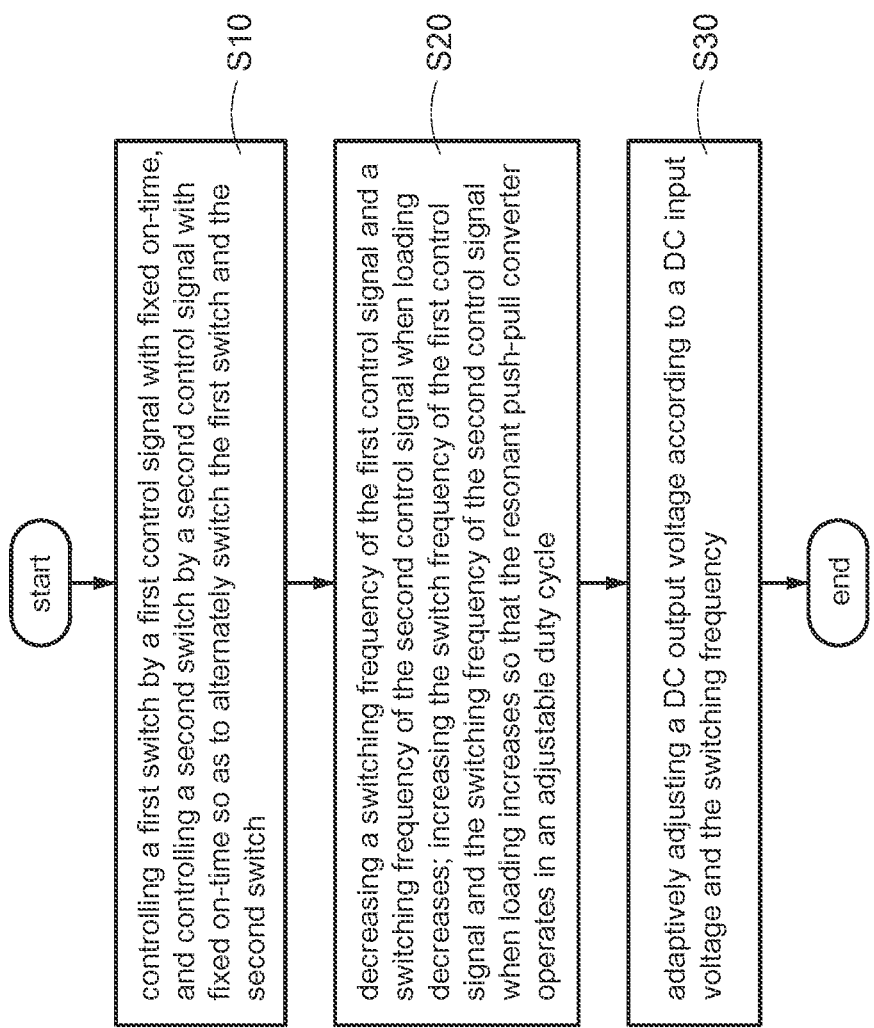
FIG. 5 is a flowchart of a method of controlling the resonant push-pull converter according to the present disclosure.

Please refer to FIG. 5, which shows a flowchart of a method of controlling the resonant push-pull converter according to the present disclosure. The method of controlling the resonant push-pull converter includes a fixed on-time control (S10) of controlling a first switch SW1 by a first control signal S1 with fixed on-time, and controlling a second switch SW2 by a second control signal S2 with fixed on-time so as to alternately switch the first switch SW1 and the second switch SW2. Therefore, by the fixed on-time control, the control can be simplified and the resonance soft-switching can be achieved.

Take the circuit structure of FIG. 1 as an example. Once the parameters of the series-connected inductor-capacitor (Lr, Cr) of the resonant push-pull converter are designed, the resonance frequency can be determined. Since switching of the switches (including the first switch SW1 and the second switch SW2) at the time of zero current can make the switching loss zero, the time when the current flowing through the switches is zero can be known from the resonance frequency. For example, assuming that the resonance frequency is 100 Hz, it can be known that the switching current that can be zero once every 10 ms. In other words, as long as the switching is performed once every 10 ms, the soft-switching effect may be achieved, and it is not necessary to detect the voltage of the resonant capacitor or the resonant current to determine the switching time. Therefore, the present disclosure can simplify the design of the controller so that the circuit can provide the first control signal S1 with fixed on-time to control the switching of the first switch SW1 and provide the second control signal S2 with fixed on-time to control the switching of the second switch SW2 so as to realize the resonance soft-switching.

As shown in FIG. 5, after the fixed on-time control, the method includes a frequency switching control (S20) of decreasing a switching frequency of the first control signal S1 and a switching frequency of the second control signal S2 when loading decreases; increasing the switch frequency of the first control signal S1 and the switching frequency of the second control signal S2 when loading increases so that the resonant push-pull converter operates in an adjustable duty cycle. In the frequency switching control, due to the frequency switching control involving load changes, optimization of resonance at light loads can be achieved.

Since the resonance frequency is fixed and the on-time is fixed (based on the fixed on-time control performed in step S10), when the loading amount becomes small and the switching frequency does not change, excess energy occurs. D=To/T, in which, D is the duty cycle, and Ton is on-time of one period T. Since Ton is fixed (based on the fixed on-time control performed in step S10), when the switching frequency decreases (the period T increases), the duty cycle D decreases; on the contrary, the duty cycle D increases. Therefore, in the frequency switching control, if the load is decreased, the switching frequency is controlled to be decreased so that the energy provided in the duty cycle becomes smaller to achieve energy balance. On the contrary, if the load is increased, the switching frequency is controlled to be increased so that the energy provided in the duty cycle becomes greater to achieve energy balance.

As shown in FIG. 5, after the frequency switching control, the method includes an output voltage control (S30) of: adaptively adjusting the DC output voltage Vout according to the DC input voltage and the switching frequency.

The output voltage of the resonant push-pull converter is related to the input voltage thereof as follows: Vout=2*N*D*Vin. In which, N is the turn ratio (fixed value) of the transformer, and D is the duty cycle.

When the duty cycle D is not fixed, that is, in the frequency switching control (S20), the operation under the adjustable duty cycle is achieved, and therefore the variable output voltage Vout is not only related to the input voltage Vin, but also related to the duty cycle D. However, based on the range of the limited duty cycle D, the allowable variation range of the input voltage Vin may be increased by adaptively adjusting a target value of the DC output voltage Vout.

For example, in circuit applications, the output voltage Vout of the resonant push-pull converter may be used as an input for a load with a wide range of voltage changes, such as an inverter as a load, and therefore the output voltage Vout allows to provide a wide range of voltage output. In one embodiment, the input voltage Vin of the resonant push-pull converter may be a battery voltage. Since the battery voltage varies greatly between the fully charged battery and the low battery (the range of battery voltage variation is wide), under the limited duty cycle D, the target value of the output voltage Vout may be varied widely by adjusting so that the allowable variation range of the input voltage Vin is increased. Therefore, it is beneficial to select the battery to provide the flexibility and convenience of the input voltage Vin.

Incidentally, although the three control manners are represented by steps (S10) to (S30) respectively in FIG. 5, in practical applications, the fixed on-time control (S10) is a necessary control method, and the remaining steps (S20) and (S30) are optional for realizing resonance optimization to achieve energy balance. Accordingly, the control method may use fixed on-time control only (i.e., only the step (S10) is performed), or the frequency switching control is used incorporated with the fixed on-time control (i.e., the step (S10) and the step (S20) are performed), or the output voltage control is used incorporated with the fixed on-time control (i.e., the step (S10) and the step (S30) are performed), or the frequency switching control and the output voltage control are used incorporated with the fixed on-time control (i.e., the step (S10), the step (S20), and the step (S30) are performed).

In summary, the present disclosure has the following features and advantages:
1. The fixed on-time control is performed under different loading amount so that the control can be simplified and the resonance soft-switching can be achieved.
2. The operation (switching) frequency is adjusted with the loading and input voltage to achieve wide-range full-resonant operation under light-load operation.

3. The target value of the output voltage may be varied widely by adjusting under the limited duty cycle so that the allowable variation range of the input voltage is increased, and therefore it is beneficial to select the battery to provide the flexibility and convenience of the input voltage.

4. The series-connected resonance technology through the resonant push-pull converters is introduced to change power switches of the converters to be soft switched by the inductor-capacitor resonance operation, thereby making the switching loss zero to increase the conversion efficiency and be beneficial to the heat dissipation design, reducing the surge voltage of the transistor so that the selected components can be rated down, and reducing the interference source generated by electromagnetic compatibility.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of controlling a resonant push-pull converter, the resonant push-pull converter comprising:
    a transformer, comprising a primary-side winding and a secondary-side winding, wherein the primary-side winding comprises a first center-tapped end, a first end, and a second end, and the first center-tapped end is coupled to a DC input voltage, wherein the secondary-side winding comprises two winding ends and a second center-tapped end;
    a first switch, coupled between the first end and a ground end providing a grounding level of the DC input voltage;
    a second switch, coupled between the second end and the ground end;
    a resonant tank, coupled to the secondary-side winding or the primary-side winding, wherein the resonant tank comprises two series-connected branches, and each series-connected branch comprises a resonant inductor and a resonant capacitor connected in series; the two series-connected branches are respectively coupled to the two winding ends, and a common contact of the two series-connected output capacitors is coupled to the second center-tapped end;
    a rectifying circuit, coupled to the secondary-side winding, and configured to convert AC power provided by the secondary-side winding into a DC output voltage; and
    two output capacitors, connected in series, and the series-connected output capacitors coupled in parallel to an output side of the rectifying circuit to provide the DC output voltage,
    wherein the method comprises a fixed on-time control of: controlling the first switch by a first control signal with fixed on-time, and controlling the second switch by a second control signal with fixed on-time so as to alternately switch the first switch and the second switch.

2. The method of controlling the resonant push-pull converter as claimed in claim 1, wherein after the fixed on-time control, comprising:
    a frequency switching control of: decreasing a switching frequency of the first control signal and a switching frequency of the second control signal when loading decreases; increasing the switch frequency of the first control signal and the switching frequency of the second control signal when loading increases.

3. The method of controlling the resonant push-pull converter as claimed in claim 2, wherein after the frequency switching control, comprising an output voltage control of: adaptively adjusting the DC output voltage according to the DC input voltage and the switching frequency of the first control signal and the second control signal.

4. The method of controlling the resonant push-pull converter as claimed in claim 1, wherein after the fixed on-time control, comprising: an output voltage control of: adaptively adjusting the DC output voltage according to the DC input voltage and a switching frequency of the first control signal and a switching frequency of the second control signal.

5. The method of controlling the resonant push-pull converter as claimed in claim 1, wherein the fixed on-time control is performed according to an input voltage signal corresponding to the DC input voltage and an output current signal.

6. The method of controlling the resonant push-pull converter as claimed in claim 1, wherein the resonant push-pull converter further comprises:
    an output capacitor, coupled in parallel to an output side of the rectifying circuit.

7. The method of controlling the resonant push-pull converter as claimed in claim 6, wherein the resonant tank comprises one series-connected branch, and the series-connected branch comprises a resonant inductor and a resonant capacitor connected in series.

8. The method of controlling the resonant push-pull converter as claimed in claim 1, wherein the fixed on-time control is performed by an analog controller or a digital controller.

* * * * *